C. C. BLOSSOM.

NUT LOCK.

APPLICATION FILED MAR. 22, 1911.

Reissued June 11, 1912.

13,425.

Witnesses:

Fred'k. W. Dannenfelser

Chas. A. Pond

Inventor

CHARLES C. BLOSSOM

By his Attorneys.

Dannenfelser Pond

COLUMBIA PLANOGRAPH CO., WASHINGTON, D. C.

UNITED STATES PATENT OFFICE.

CHARLES C. BLOSSOM, OF WICKFORD, RHODE ISLAND.

NUT-LOCK.

13,425. Specification of Reissued Letters Patent. Reissued June 11, 1912.

Original No. 950,629, dated March 1, 1910, Serial No. 492,021. Application for reissue filed March 22, 1911. Serial No. 616,284.

*To all whom it may concern:*

Be it known that I, CHARLES C. BLOSSOM, a citizen of the United States, and a resident of Wickford, county of Washington, State of Rhode Island, have invented a new and useful Improvement in Nut-Locks, of which the following is a specification, reference being had to the accompanying drawing, in which—

Figure 1:
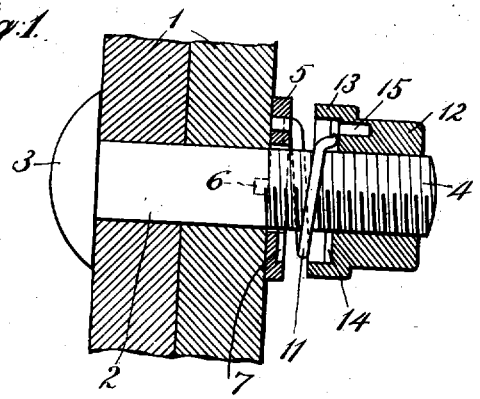
Figures 2, 2A:
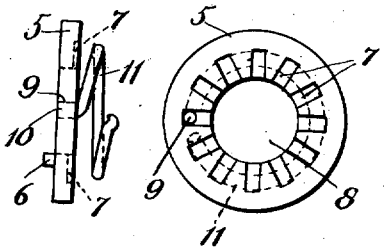
Figures 3, 3A:
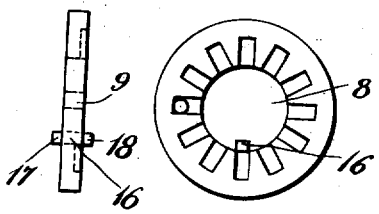
Figure 4:
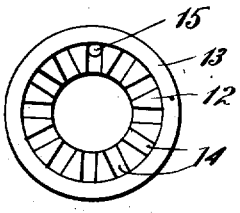
Figure 5:
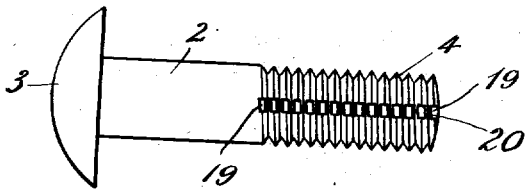

Figure 1 illustrates an elevation, partly in section, of the invention, all the parts being assembled and in operative position; Fig. 2 illustrates an edgewise view of the preferred form of washer, the spring pawl being permanently connected with it by riveting; Fig. 2ª illustrates a face view of the washer shown in Fig. 2, the spring pawl being shown in dotted lines; Fig. 3 illustrates a modified form of washer; Fig. 3ª illustrates a face view of the washer shown in Fig. 3; Fig. 4 illustrates an interior view of the preferred form of nut used with the invention; Fig. 5 illustrates the bolt which is used when the washer shown in Figs. 3 and 3ª is used.

Many forms of nut lock resembling generally that shown herein have been heretofore invented and patented, but they have all, so far as I am aware, been open to one or the other of a series of objections which it is the object of this present invention to obviate.

Among the objections referred to are the following: The spring pawl relied on to effect the locking of the nut has always been a loose, separate part, very apt to become misplaced or lost during the installation of the work in the first instance, or during repair, thus rendering the entire device useless. Again the groove cut in the shank of the bolt when that form of lock has been employed to prevent the washer from turning has been cut so deep that moisture could penetrate through the groove, past the threads of the bolt and nut, into the very center of the structure, thus rusting out the spring pawl and other parts and soon destroying the efficiency of the whole. Again the notches in which the point of the pawl engage and which are relied upon to effect the locking of the nut have generally been either upon the nut or upon the washer. Consequently, as soon as they become worn in use, or because of rusting away, the usefulness of the entire structure is also gone. By this present invention I obviate all the foregoing objections.

Referring now to the drawings, 1, 1, represent the parts, whatever they may be, which are to be bolted together, 2 the bolt which may be headed at one end as at 3, and threaded at the other end, 4.

5 is a washer which has a hole 8 through its center which preferably fits the bolt somewhat accurately. The preferred form of washer is shown in Figs. 2 and 2ª. In it a stud 6 projects from one of its sides, preferably adjacent to the bolt hole and on the other side there are produced a radiating series of notches 7, which preferably surround the central opening or bolt hole 8. At some suitable place in this washer there is also made a hole 9 in which the end 10 of the spring pawl 11 is placed and riveted or otherwise permanently fastened, so that the pawl cannot become detached from the washer.

The nut 12, which I prefer to use, is shown in section in Fig. 1, and in plan in Fig. 4, where a view of its hollow interior is shown. Its exterior is preferably made angular in form, that it may be conveniently turned by an ordinary wrench. It is also preferably provided with a projecting annular flange 13, which will inclose the spring pawl, thus protecting it from injury and will also act as a guide for it during the operation of screwing up or unscrewing the nut; the flange will also act as a stop to the nut preventing it from being screwed up so far as to injure the spring pawl, or the notches, because the outer edge of the flange, after the nut has been properly screwed up, will come in contact with the surface of the washer which is adjacent to it, thus arresting further movement of the nut. In the bottom of the cup-shaped recess in the nut formed by the surrounding flange, a series of notches 14, resembling the notches 7 on the washer are made and there is also provided a hole 15, resembling the hole 9 in the washer. It is adapted to receive the end 10 of the spring pawl. This hole may be bored entirely through the nut, which will facilitate the riveting of the end of the spring pawl therein, or only part way through, if preferred, for the sake of excluding moisture, etc., from the structure. If the latter construction is employed, then I prefer to expand the hole somewhat near its bottom so that the end of the spring pawl may be upset therein, that it may be more firmly held.

The bolt which I prefer to employ with the parts thus far described is shown in Fig. 5, except that it will not have the groove shown in it (hereinafter to be described) which need be used only when the washer shown in Figs. 3 and 3ª, which has not yet been referred to, is used.

The operation of the structure thus far described is as follows: The parts are assembled as shown in Fig. 1. The washer is prevented from turning by the stud 6 which enters a suitable notch or recess which may be conveniently made with the hammer and cold chisel, or with a file, in the edge of the bolt hole made through the appropriate piece 1. The spring pawl being permanently attached to the washer, will, when the washer is itself in position be likewise properly located surrounding the bolt, to perform its function. Thereupon the nut is threaded onto the bolt and screwed down tight, in so doing the free end of the spring pawl will engage in and slip from one to the other of the notches 14 in the cup of the nut and when the nut is screwed completely home, the end of the pawl will rest in or against the particular notch with which it last engaged and will prevent the nut from turning backwardly under the influence of such shocks or jars as it will be subjected to in use, but the free end of the pawl and the notches may be so rounded in shape that the nut may be turned backwardly when sufficient power is intentionally applied to it, as by a wrench or equivalent tool, and thus the nut be loosened.

In certain uses of lock nut bolts of the class in question it is desirable that the nut should be frequently loosened; in such cases the notches are after a time apt to be worn away or so rounded off that the pawl will not any longer hold sufficiently against them. In order therefore to extend the life of the structure, I provide the notches 7 in the washer (see Fig. 2ª) and a hole 15 in the nut (see Fig. 4), so that should the notches in the nut become defective, as suggested, the end of the pawl may be disengaged from the hole in the washer and transferred to and suitably fastened in the hole 15 of the nut, whereupon its free end will engage in the hitherto unused notches in the washer in the same manner that it before engaged in the notches in the nut, and thus the life of the structure will be doubled.

In Figs. 3, 3ª and 5 I show a construction of the washer and bolt somewhat resembling forms now known, but with the following differences. Instead of the lug 6 shown in Figs. 2 and 2ª, to prevent the turning of the washer, I provide a lug 16, which projects inwardly toward the center of the bolt hole 8, and if the washer is not thick enough to give the requisite strength or bearing to this lug, then it may be extended above and below the washer, as seen at 17, and 18, one or both. This lug fits in a groove 19 made in the side of the bolt, but instead of being deeper than the bottom of the threads on the bolt which it cross-cuts, the groove is so shallow that an appreciable part of the threads remain extending across the bottom of the groove, as shown at 20. Consequently when the nut is run on the bolt, the tops of its threads make contact metal to metal with the remainder of the threads extending across the groove, thus preventing the entrance of moisture and dirt which would tend to clog and rust the interior parts and hasten their destruction.

The operation of the form of the invention just described will be understood without specific explanation, from that which has already been said.

The specific details of construction described and illustrated may be somewhat departed from and yet the essentials of my invention be employed. I therefore do not limit myself to such details.

I claim:

1. The combination with a threaded bolt of a threaded nut provided with rounded notches and having a hole adapted to receive the end of a pawl, a washer provided with rounded notches and having also a hole adapted to receive the end of said pawl, a reversible spring pawl, one end of which is adapted to be interchangeably fastened in the hole in the nut or the hole in the washer, as desired, and means to prevent said washer from turning.

2. The combination with a threaded bolt of a threaded nut, a flange on the nut, rounded notches on the nut within the flange, a washer having rounded notches, a reversible spring pawl, one end of which is adapted to be interchangeably fastened to the nut or to the washer, as desired, and means to prevent the washer from turning.

3. The combination of a threaded bolt having a groove which cross-cuts the threads, but does not entirely remove them, a washer having a lug adapted to enter the groove in the bolt and having also rounded notches, a threaded nut having rounded notches, a pawl interposed between the nut and the washer, and means whereby the pawl may be interchangeably attached to either the nut or the washer, so as to engage with the notches upon the other of said parts and prevent the nut from turning.

4. The combination of a threaded bolt, a washer having means to prevent turning upon the bolt and having also rounded notches, a threaded nut having rounded notches, a pawl interposed between the nut and the washer, and means whereby the pawl may be interchangeably attached to either the nut or the washer so as to engage with the notches upon the other of said parts and prevent the nut from turning.

CHARLES C. BLOSSOM.

Witnesses:
MARY A. GADSDEN,
HELEN H. GREENE.

Copies of this patent may be obtained for five cents each, by addressing the "Commissioner of Patents Washington, D. C."